United States Patent
Jeon et al.

(10) Patent No.: US 12,502,987 B2
(45) Date of Patent: Dec. 23, 2025

(54) BATTERY SUPPORT BODY AND AIRCRAFT INCLUDING SAME

(71) Applicants: Hyundai Motor Company, Seoul (KR); Kia Corporation, Seoul (KR)

(72) Inventors: Yoon Cheol Jeon, Suwon-Si (KR); Hyun Ki Cho, Anyang-Si (KR); Jin Soo Jang, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/230,788

(22) Filed: Aug. 7, 2023

(65) Prior Publication Data

US 2024/0326614 A1    Oct. 3, 2024

(30) Foreign Application Priority Data

Apr. 3, 2023    (KR) ........................ 10-2023-0043564

(51) Int. Cl.
| | | |
|---|---|---|
| *B60L 50/60* | (2019.01) | |
| *B64C 3/32* | (2006.01) | |
| *B64D 27/40* | (2024.01) | |
| *F16F 7/00* | (2006.01) | |
| *H01M 50/204* | (2021.01) | |
| *H01M 50/242* | (2021.01) | |
| *H01M 50/249* | (2021.01) | |

(52) U.S. Cl.
CPC ............... *B60L 50/66* (2019.02); *B64C 3/32* (2013.01); *B64D 27/40* (2024.01); *F16F 7/00* (2013.01); *H01M 50/204* (2021.01); *H01M 50/242* (2021.01); *H01M 50/249* (2021.01); *B60L 2200/10* (2013.01); *H01M 2220/20* (2013.01)

(58) Field of Classification Search
CPC .. B60L 50/66; B60L 2200/10; H01M 50/249; H01M 50/242; H01M 50/204; H01M 2220/20; B64D 27/40; B64C 3/32; F16F 7/00
See application file for complete search history.

(56) References Cited

U.S. PATENT DOCUMENTS

| | | | |
|---|---|---|---|
| 4,174,014 A | * | 11/1979 | Bjorksten ........... H01M 50/293 180/68.5 |
| 8,967,529 B1 | | 3/2015 | Bennett |
| 10,946,958 B2 | | 3/2021 | Baek et al. |
| 11,394,078 B1 | * | 7/2022 | Donovan ........... H01M 50/218 |
| 11,434,014 B2 | | 9/2022 | Halverson |
| 11,437,662 B1 | * | 9/2022 | Wiegman ........... H01M 50/298 |

(Continued)

FOREIGN PATENT DOCUMENTS

| | | |
|---|---|---|
| CN | 210126633 U | 3/2020 |
| DE | 102018132849 A1 | 6/2020 |
| WO | 2020044134 A1 | 3/2020 |

OTHER PUBLICATIONS

Apr. 25, 2024—(EP) Extended European Search Report—App 23207396.5.

*Primary Examiner* — Carlos Amaya
(74) *Attorney, Agent, or Firm* — Banner & Witcoff, Ltd.

(57) ABSTRACT

A battery support body may include a bracket extending in a front-rear direction and a shock absorber, which may extend in the front-rear direction and may be coupled to the bracket in a direction crossing the front-rear direction. At least a portion of the shock absorber may be provided in the form of foam.

13 Claims, 7 Drawing Sheets

(56) References Cited

U.S. PATENT DOCUMENTS

| | | |
|---|---|---|
| 11,691,709 B1 * | 7/2023 | Donovan ............ H01M 50/264 188/377 |
| 2016/0052638 A1 | 2/2016 | Kamihara et al. |
| 2019/0263498 A1 | 8/2019 | Bernasconi et al. |

* cited by examiner

BATTERY SUPPORT BODY AND AIRCRAFT INCLUDING SAME

CROSS-REFERENCE TO RELATED APPLICATION(S)

This application claims priority from and the benefit of Korean Patent Application No. 10-2023-0043564, filed on Apr. 3, 2023, which is hereby incorporated by reference for all purposes as if set forth herein.

TECHNICAL FIELD

Exemplary aspects relate to a battery support body and an aircraft including same.

BACKGROUND

All-electric aircraft that use batteries as a power source should be equipped with multiple batteries. A fuselage may be considered as a place in which the batteries are mounted. The fuselage is usually used as a cabin and a luggage room. Accordingly, when the batteries are mounted on the fuselage, a space for boarding passengers or a space for loading luggage is reduced.

Therefore, it may be more appropriate to mount the batteries on a wing rather than the fuselage in consideration of factors such as marketability. However, if the batteries are mounted on the wing of an aircraft, the aircraft may be more affected by vibration load than if the batteries are mounted on the fuselage. Accordingly, additional reinforcement for the batteries may be required compared to if the batteries are mounted on the fuselage. If the wing is too heavy, the control of the aircraft may be difficult. Accordingly, it is necessary to prevent the wing from becoming too heavy while reinforcing the batteries.

SUMMARY

Systems, apparatuses, and methods are described for a battery support body. The support body may include a bracket extending in a front-rear direction, and a shock absorber. The shock absorber may extend in the front-rear direction and may be coupled to the bracket in the direction crossing the front-rear direction, and at least a portion of which may include a foam.

Additionally or alternatively, systems, apparatuses, and methods are described for an aircraft. The aircraft may include a fuselage and a wing extending from the fuselage in a wing root-wing tip direction. The wing may include a wing frame that may be coupled to the fuselage. The aircraft may further include a plurality of batteries coupled to the wing frame. The plurality of batteries may be arranged in the wing root-wing tip direction and may be configured to store power. The aircraft may additionally include a plurality of power relay assemblies electrically connected to the plurality of batteries, and a plurality of battery support bodies. Each of the plurality of battery support bodies may be arranged between two adjacent batteries of the plurality of batteries or between one battery of the plurality of batteries and one power relay assembly of the plurality of power relay assemblies, to support the plurality of batteries.

These and other features and advantages are described below in greater detail.

BRIEF DESCRIPTION OF THE DRAWINGS

The accompanying drawings, which are included to provide a further understanding of the present disclosure and are incorporated in and constitute a part of this specification, illustrate examples of the disclosure, and together with the description serve to explain the principles of the disclosure.

DETAILED DESCRIPTION

Hereinafter, examples of the present disclosure are described in more detail with reference to the accompanying drawings. When reference numerals are given to elements in each drawing, it should be noted that the same elements are designated by the same reference numerals if possible although they are shown in different drawings. Also, in describing examples of the present disclosure, a detailed description of related known configurations or functions is omitted when it is determined that the understanding of the examples of the present disclosure is hindered by the detailed description.

In describing components of examples of the present disclosure, terms such as first, second, A, B, (a), and (c) may be used. These terms are only used to distinguish one component from other components, and the characteristics, orders, or sequences of the corresponding components are not limited by the terms. When one component is described as being "connected," "coupled," or "linked" to another component, this component may be directly connected or linked to another component, but it should be understood that other components may be "connected," "coupled," or "linked" between these components.

Figure 1:
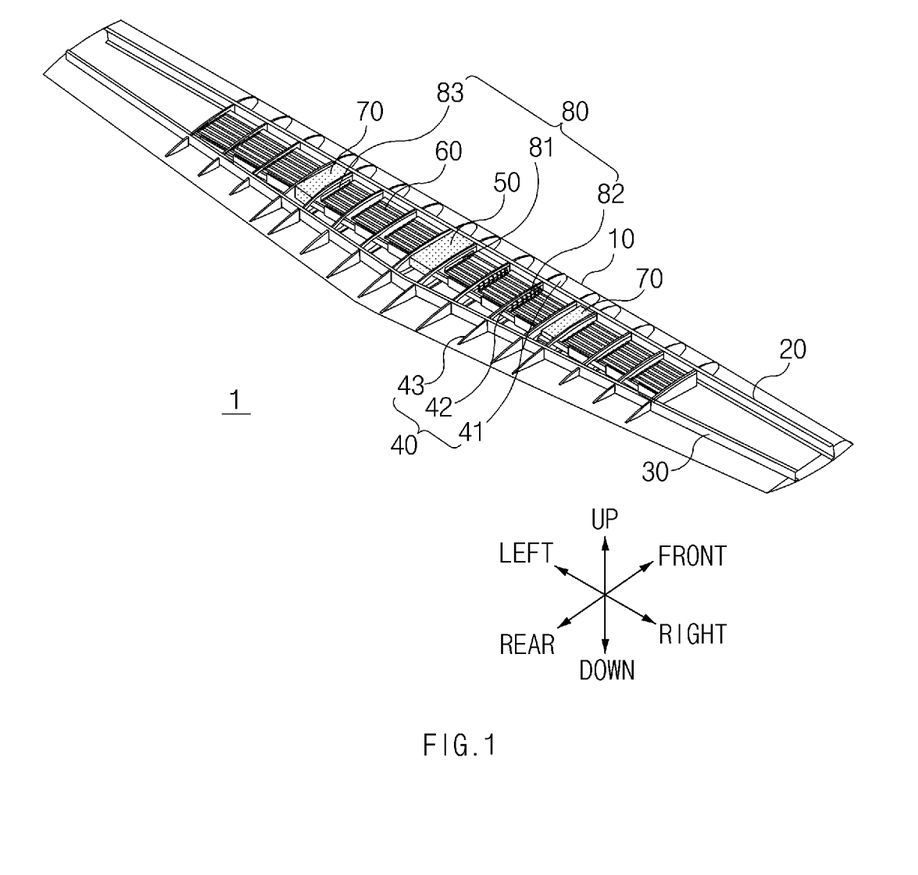
FIG. 1 is a perspective view showing an internal structure of a wing in an aircraft according to an example of the present disclosure.
Figure 2:
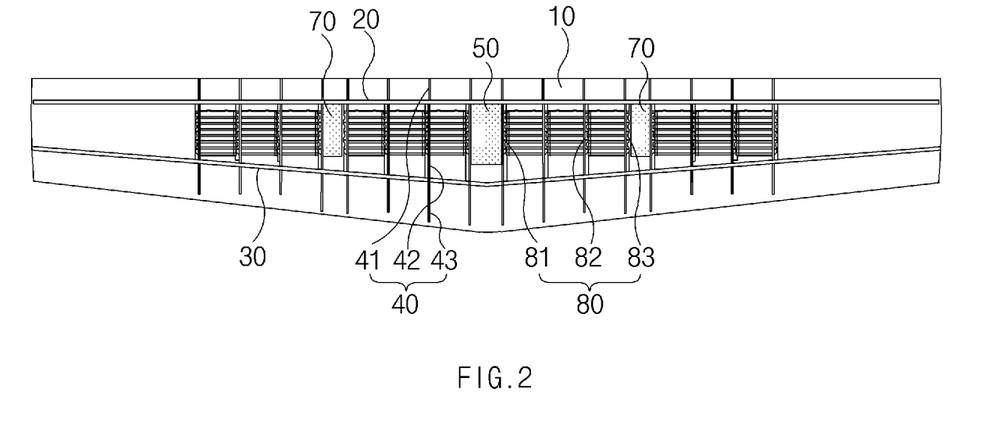
FIG. 2 is a plan view showing an internal structure of a wing in an aircraft according to one or more examples of the present disclosure.
Figure 3:
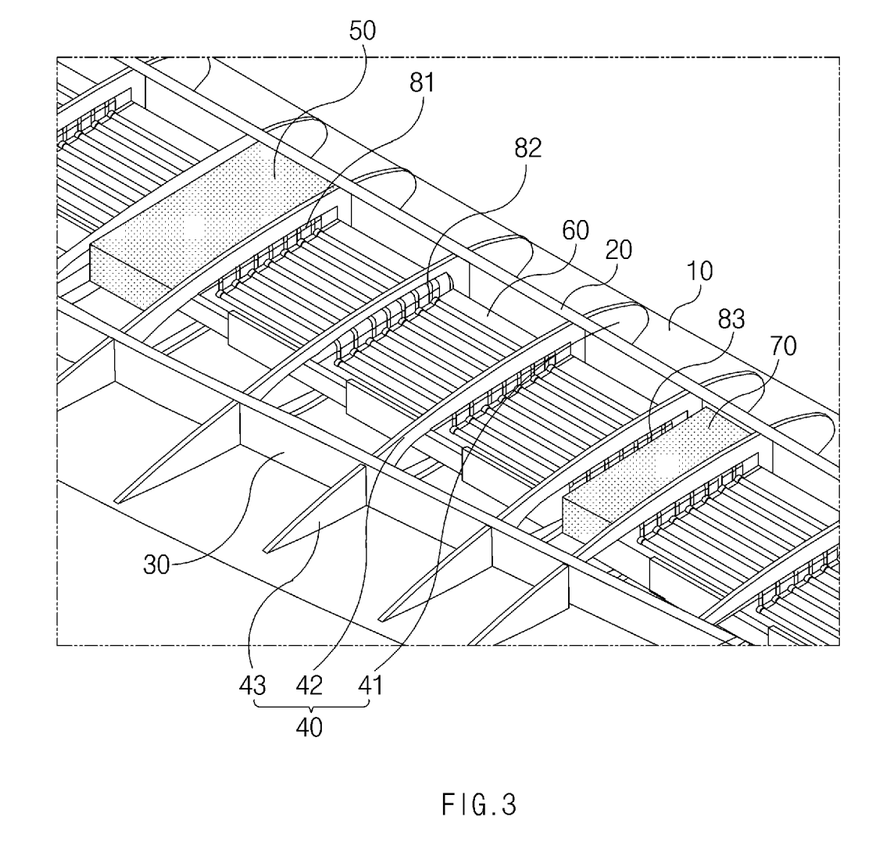
FIG. 3 is a perspective view showing a portion of an internal structure of a wing in an aircraft according to one or more examples of the present disclosure.

FIG. 1 is a perspective view showing an internal structure of a wing 1 in an aircraft according to one or more examples of the present disclosure. FIG. 2 is a plan view showing the internal structure of the wing 1 in the aircraft according to one or more examples of the present disclosure. FIG. 3 is a perspective view showing a portion of the internal structure of the wing 1 in the aircraft according to one or more examples of the present disclosure.

An aircraft according to one or more examples of the present disclosure includes a fuselage omitted in the drawings and the wing 1 that can be seen in the drawings. The fuselage may have a shape extending in a front-rear direction and may have a streamlined shape, but the shape thereof is not limited thereto. In the fuselage, a cabin, on which people may board, or a luggage room, in which luggage may be loaded, may be formed. In the fuselage, various electronic devices or mechanical devices, for example, for controlling the aircraft, may be installed.

The wing 1 may be coupled to the fuselage. The wing 1 may extend from the fuselage in the left-right direction. The "left-right" direction may be understood as the direction from the wing root to the wing tip or the wing root-wing tip direction. The wing 1 may be coupled to the upper side of the fuselage. When viewed in the up-down direction, the wing 1 may have a symmetrical shape in a straight line extending in the front-rear direction.

The wing 1 may include a wing cover 10 and a wing frame. The wing cover 10 may cover the wing frame so that the wing frame is not exposed. If viewed in the up-down direction, the profile of the front side of the wing cover 10 may have a straight line that extends, for example, in the left-right direction. If viewed in the up-down direction, the profile of the rear side of the wing cover 10 may have a straight-line shape that is inclined forward to the outside in the left-right direction. In a cross-section taken along a plane perpendicular to the left-right direction, the wing cover 10 may have a rounded streamlined profile with a sharp rear end and a forwardly convex front end. However, the shape of the wing cover 10 is not limited thereto.

The aircraft may include a plurality of batteries 60. Each of the batteries 60 may be provided to store power. The batteries 60 may be a secondary battery that includes, for example, a lithium-ion-polymer battery cell, a lithium-iron phosphate battery cell, etc., but the type of battery cell constituting the battery 60 is not limited thereto. The plurality of batteries 60 may be arranged between adjacent rib parts 40 among a plurality of rib parts 40 described below. The plurality of batteries 60 may be arranged spaced apart from each other in the left-right direction.

The aircraft may include power relay assemblies 50 and 70. The power relay assemblies 50 and 70 may be electrically connected to one or more of the plurality of batteries 60. The power relay assemblies 50 and 70 may be electrically connected to the fuselage. The power relay assemblies 50 and 70 may serve to transmit power from the batteries 60 to the fuselage.

The wing 1 may comprise a plurality of power relay assemblies. The plurality of power relay assemblies 50 and 70 may include a central power relay assembly 50 that may be located at the center of the wing frame in the left-right direction and an outer power relay assembly 70 that may not be located at the center. The plurality of power relay assemblies 50 and 70 may be symmetrically arranged in the left-right direction. Therefore, the outer power relay assembly 70 may include a plurality of outer power relay assemblies.

The wing frame may be located inside the wing cover 10 and coupled to the fuselage. The wing frame may serve as a skeleton of the wing 1, for example, to impart rigidity to the wing 1.

The wing frame may include a front wing beam 20, a rear wing beam 30, and a plurality of rib parts 40. The front wing beam 20 may extend in the left-right direction. The front wing beam 20 may have a shape perpendicular to the front-rear direction, but the shape thereof is not limited thereto.

The rear wing beam 30 may be spaced rearward from the front wing beam 20. The rear wing beam 30 may extend to be inclined forward to the outside in the left-right direction. That is, the rear wing beam 30 may be substantially 'V' shaped, and the distance from the front wing beam 20 may decrease toward the outside in the left-right direction, but the shape thereof is not limited thereto.

The rib parts 40 may be coupled to the front wing beam 20 and/or the rear wing beam 30. The rib parts 40 may be coupled to the front wing beam 20 and the rear wing beam 30 so as to form the wing frame in which the front wing beam 20 and the rear wing beam 30 are integrated. The plurality of rib parts 40 may be arranged spaced apart from each other in the left-right direction. Each of the rib parts 40 may extend in the front-rear direction. Therefore, the front wing beam 20, the rear wing beam 30, and the plurality of rib parts 40 may form a lattice structure, and thus, high rigidity may be imparted to the wing 1 even with a reduced weight.

The rib part 40 may include a middle rib 42. The middle rib 42 may be coupled to the rear side of the front wing beam 20 and the front side of the rear wing beam 30. The front end of the middle rib 42 may be coupled to the rear surface of the front wing beam 20, and the rear end of the middle rib 42 may be coupled to the front surface of the rear wing beam 30. The middle ribs 42 may be arranged between the front wing beam 20 and the rear wing beam 30. As the plurality of middle ribs 42 are spaced apart from each other in the left-right direction, the batteries 60 or the power relay assemblies 50 and 70 may be arranged between adjacent middle ribs 42. The batteries 60 may, additionally or alternatively, be arranged between the outer power relay assembly 70 and the central power relay assembly 50.

The rib part 40 may include a front rib 41. The front rib 41 may protrude forward from the front wing beam 20. The front rib 41 may have a shape with a forwardly convex front end, but the shape thereof is not limited thereto. The front rib 41 may be coupled to the front side of the front wing beam 20. The rear end of the front rib 41 may be coupled to the front surface of the front wing beam 20.

The rib part 40 may include a rear rib 43. The rear rib 43 may protrude rearward from the rear wing beam 30. The rear rib 43 may have a shape with a rearwardly sharp rear end (e.g., tapered in the rear direction), but the shape thereof is not limited thereto. The rear rib 43 may be coupled to the rear side of the rear wing beam 30. The front end of the rear rib 43 may be coupled to the rear surface of the rear wing beam 30.

Figure 4:
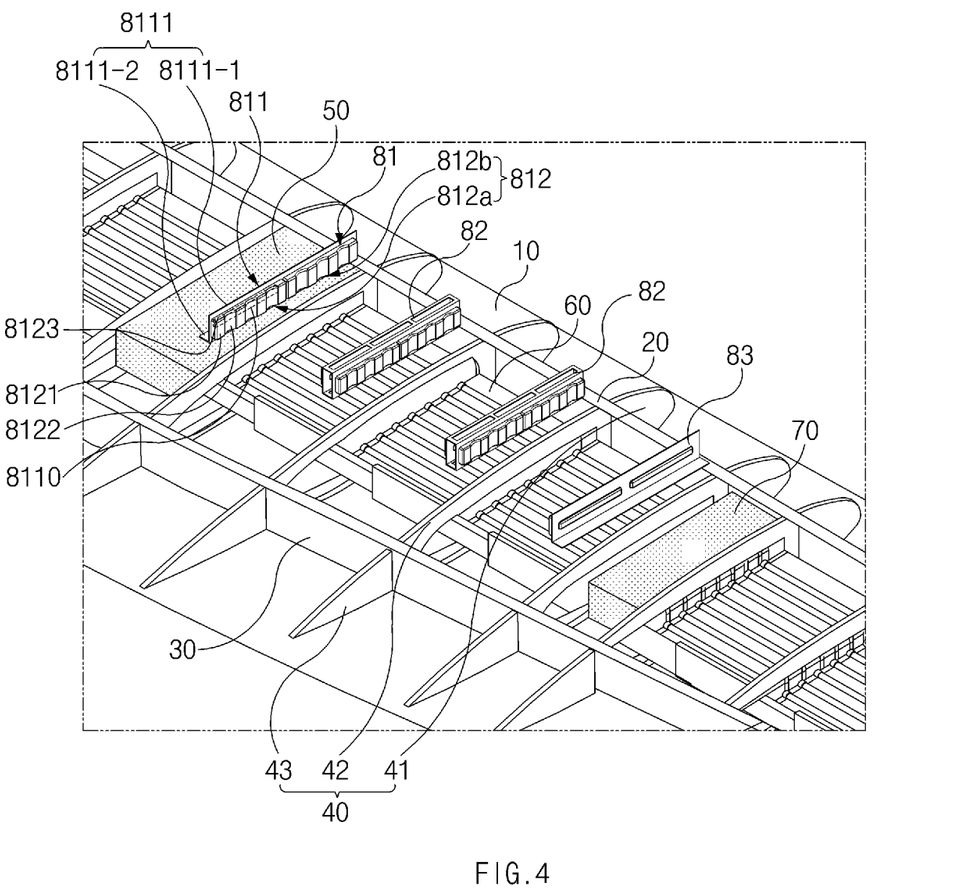
FIG. 4 is a perspective view showing a state in which a battery support body is separated from the wing of FIG. 3.

FIG. 4 is a perspective view showing a state in which a battery support body 80 is separated from the wing 1 of FIG. 3.

The aircraft according to one or more aspects of the present disclosure may include a battery support body 81, 82, 83. The battery support body 80 may include a plurality of battery support bodies and may be arranged inside the wing cover 10 and spaced apart from each other, for example, in the left-right direction. The battery support body 80 may be arranged between the plurality of batteries 60 or between the batteries 60 and the power relay assemblies 50 and 70 so as to support the plurality of batteries 60. For example, each battery support body 80 may be arranged between two adjacent batteries 60 of the plurality of batteries 60, or between a battery 60 and a power relay assembly 50 or 70.

Figure 5:
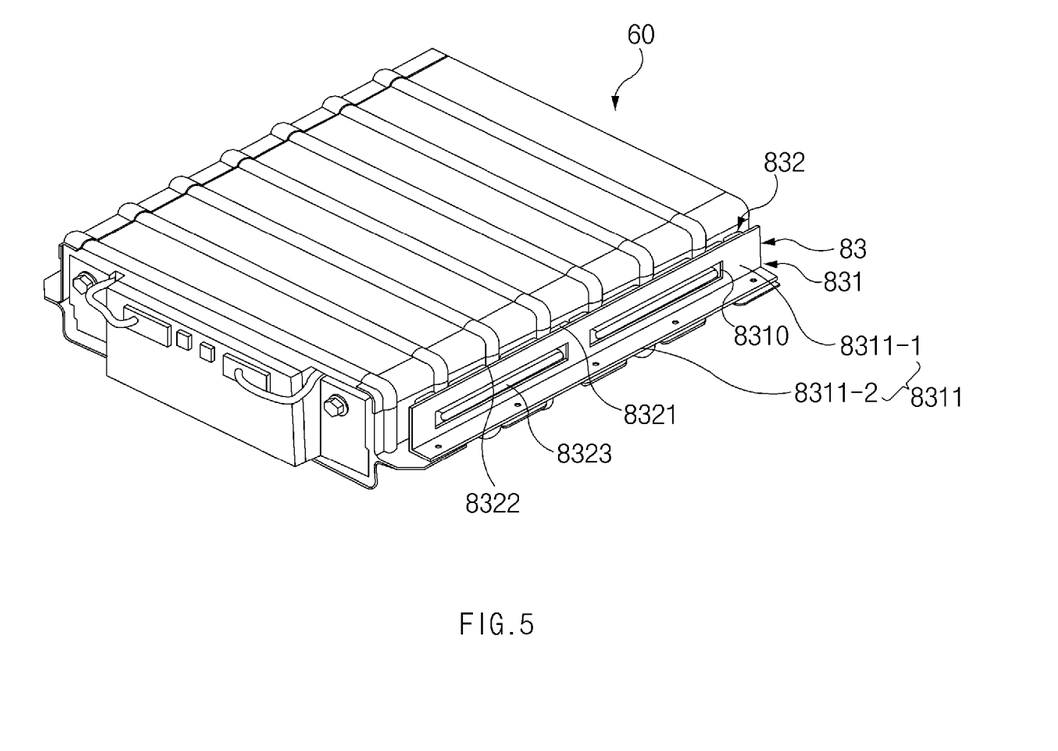
FIG. 5 is a perspective view illustrating a battery and a third battery support body according to one or more examples of the present disclosure.
Figure 6:
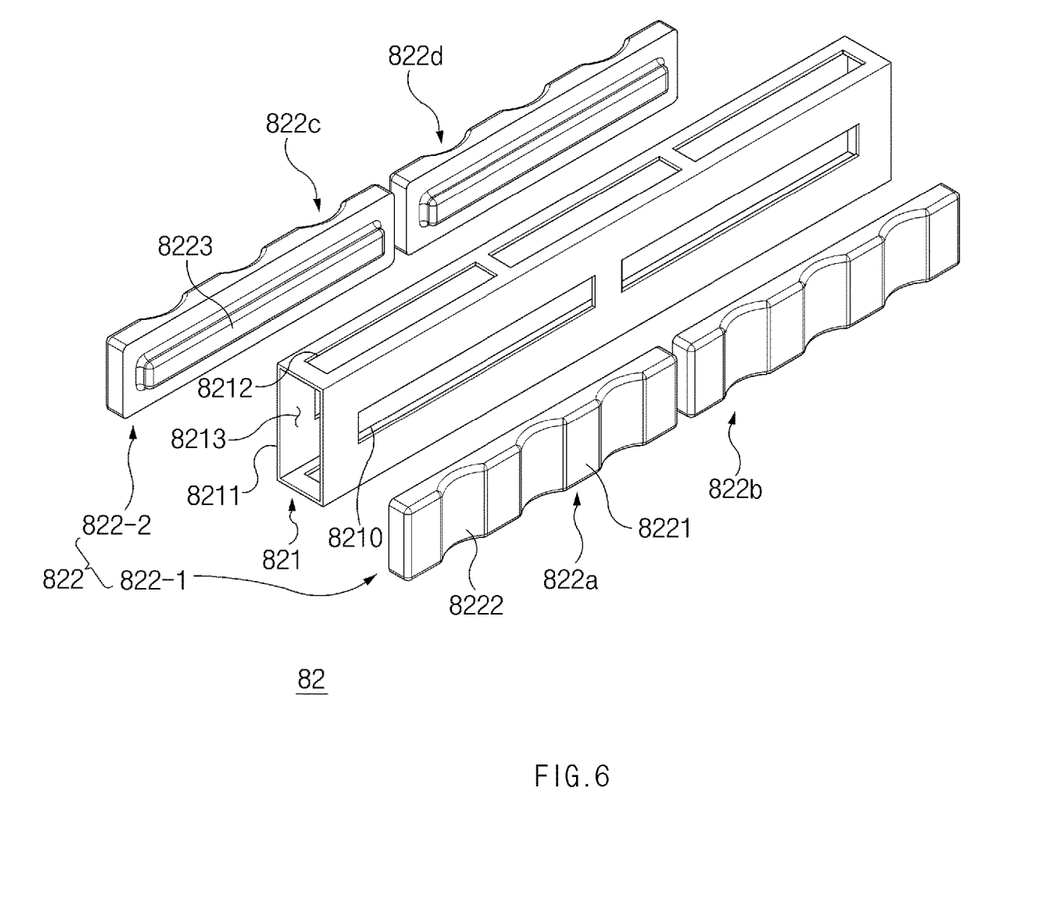
FIG. 6 is an exploded perspective view illustrating a second battery support body according to one or more examples of the present disclosure.

Further referring to FIGS. 4, 5 and 6, the battery support body 81, 82, 83 may include brackets 811, 821, and 831 that extend in the front-rear direction. The brackets 811, 821, and 831 may include bracket bodies and bracket coupling portions 8210 and 8310 provided in the bracket bodies.

The battery support body 80 may include shock absorbers 812, 822, and 832 coupled to the brackets 811, 821, and 831, respectively. The shock absorbers 812, 822, and 832 may extend in the front-rear direction and may be coupled to the brackets 811, 821, and 831, respectively, in a direction crossing the front-rear direction. The shock absorbers 812, 822, and 832 may be coupled to the brackets 811, 821, and 831, respectively, in the left-right direction.

At least a portion of each of the shock absorbers 812, 822, and 832 may be provided in the form of shock absorbent material, e.g., foam, and be in contact with the battery 60. Accordingly, the shock absorbers 812, 822, and 832 may absorb vibration applied to the battery 60. The shock absorbers 812, 822, and 832 may be made of a material that includes, for example, at least one of foamed polypropylene, polyurethane, polyethylene, aluminum, rubber, polystyrene, or any combination thereof (polyurethane-polyethylene, aluminum-rubber-polystyrene, etc.).

The shock absorbers 812, 822, and 832 may include shock absorber bodies 8221 and 8321 and shock absorber protrusions 8223 and 8323 that protrude from the shock absorber bodies 8221 and 8321 and are inserted into the bracket coupling portions 8210 and 8310, respectively. The shock absorbers 812, 822, and 832 may include a plurality of shock absorber grooves 8222 and 8322 that are formed by recessing surfaces of the shock absorber bodies 8221 and 8321, respectively. The shock absorbers 812, 822, and 832 may have a plurality of shock absorbing units 822a, 822b, 822c, and 822d which may be divided in the front-rear direction.

The battery support body 80 may include a first battery support body 81. The first battery support body 81 may comprise a battery support body 80 that is located between the central power relay assembly 50 and the battery 60 adjacent to the central power relay assembly 50 among the plurality of batteries 60.

The first battery support body 81 may include a first bracket 811 coupled to the wing frame and a first shock absorber 812 coupled to the first bracket 811 and being in contact with the battery 60. In order for the first shock absorber 812 to be in contact with the battery 60 and support the battery 60, the first shock absorber 812 may be coupled to a first bracket body 8111 from the outside to the inside in the left-right direction.

The first bracket 811 may include the first bracket body 8111. The first bracket body 8111 may include a first support portion 8111-1 having a plate shape and being perpendicular to the left-right direction and a first base portion 8111-2 extending inward from the lower end of the first support portion 8111-1 in the left-right direction. The first base portion 8111-2 may be coupled to the wing frame or coupled to the battery 60 using fasteners or the like. The first base portion 8111-2 may support the first bracket 811 and prevent the first bracket 811 from being pushed outward by the battery 60 in the left-right direction.

The first bracket 811 may include a first bracket coupling portion 8110 that is provided on the first bracket body 8111. The first bracket coupling portion 8110 may include a hole that passes through the first bracket body 8111 in the left-right direction, or may include a groove that is formed by recessing the first bracket body 8111 inward in the left-right direction. Two first bracket coupling portions 8110 may be provided and spaced apart from each other in the front-rear direction, but the number and arrangement thereof are not limited thereto.

The first shock absorber 812 may include a first shock absorber body 8121. The first shock absorber 812 may include a plurality of first shock absorber grooves 8122 that are formed by recessing the surface of the first shock absorber body 8121. The outer surface of the first shock absorber body 8121 may be recessed inward in the left-right direction to form the first shock absorber grooves 8122. The plurality of first shock absorber grooves 8122 may be arranged spaced apart from each other in the front-rear direction. The plurality of first shock absorber grooves 8122 may be provided in the first shock absorber body 8121, and thus, the outer surface of the first shock absorber body 8121 may have an appearance that is corrugated in the left-right direction.

The first shock absorber 812 may include a first shock absorber protrusion 8123 that protrudes from the first shock absorber body 8121 and is inserted into the first bracket coupling portion 8110. The first shock absorber protrusion 8123 may protrude inward from the inner surface of the first shock absorber body 8121 in the left-right direction.

The first shock absorber 812 may include a plurality of first shock absorbing units 812a, 812b divided in the front-rear direction. Each of the first shock absorbing units 812a, 812b may include the first shock absorber body 8121 and the first shock absorber protrusion 8123. The drawing illustrates that two first shock absorbing units 812a, 812b are provided, but the number thereof is not limited thereto.

A double-sided tape may be attached to at least a portion of the outer surface of the first shock absorber body 8121 adjacent to the first shock absorber protrusion 8123. The double-sided tape may be attached to each of the first bracket body 8111 and the first shock absorber body 8121, and thus, the first shock absorber 812 may be fixed to the first bracket 811.

FIG. 5 is a perspective view illustrating a battery 60 and a third battery support body 83 according to an exemplary embodiment of the present disclosure.

The battery support body 80 may include a third battery support body 83. The third battery support body 83 may comprise a battery support body 80 that is located between the outer power relay assembly 70 (e.g., a power relay assembly distanced from the center of the wing 1, e.g., in the left-right direction) and the battery 60 adjacent to the outer power relay assembly 70 among the plurality of batteries 60.

The third battery support body 83 may include a third bracket 831, which may be coupled to the wing frame, and a third shock absorber 832, which may be coupled to the third bracket 831, which may be in contact with the battery 60. In order for the third shock absorber 832 to be in contact with the battery 60 and support the battery 60, the third shock absorber 832 may be coupled to a third bracket body 8311 from the inside to the outside in the left-right direction.

The third bracket 831 may include the third bracket body 8311. The third bracket body 8311 may include a third support portion 8311-1 having a plate shape and being perpendicular to the left-right direction and a third base portion 8311-2 extending outward from the lower end of the third support portion 8311-1 in the left-right direction. The third base portion 8311-2 may be coupled to the wing frame or coupled to the battery 60 using fasteners or the like. The third base portion 8311-2 may support the third bracket 831 and prevent the third bracket 831 from being pushed outward by the battery 60 in the left-right direction.

The third bracket 831 may include a third bracket coupling portion 8310 that is provided on the third bracket body 8311. The third bracket coupling portion 8310 may include a hole that passes through the third bracket body 8311 in the left-right direction as illustrated in the drawings, or may include a groove that is formed by recessing the third bracket body 8311 outward in the left-right direction. Two third bracket coupling portions 8310 may be spaced apart from each other in the front-rear direction as illustrated in the drawing, but the number thereof is not limited thereto.

The third shock absorber 832 may include a third shock absorber body 8321. The third shock absorber 832 may include a plurality of third shock absorber grooves 8322 that may be formed by recessing the surface of the third shock absorber body 8321. The inner surface of the third shock absorber body 8321 may be recessed outward in the left-right direction to form the third shock absorber grooves 8322. The plurality of third shock absorber grooves 8322 may be arranged spaced apart from each other in the front-rear direction. The plurality of third shock absorber grooves 8322 may be provided in the third shock absorber body 8321, and thus, the inner surface of the third shock absorber body 8321 may have an appearance that is corrugated in the left-right direction.

The third shock absorber 832 may include a third shock absorber protrusion 8323 that protrudes from the third shock absorber body 8321 and is inserted into the third bracket coupling portion 8310. The third shock absorber protrusion 8323 may protrude outward from the outer surface of the third shock absorber body 8321 in the left-right direction.

The third shock absorber 832 may include a plurality of third shock absorbing units divided in the front-rear direction. Each of the third shock absorbing units may include the third shock absorber body 8321 and the third shock absorber protrusion 8323. The drawings illustrate that two third shock absorbing units are provided, but the number thereof is not limited thereto.

FIG. 6 is an exploded perspective view depicting a second battery support body 82 according to one or more aspects of the present disclosure.

The battery support body may include a second battery support body 82. The second battery support body 82 may comprise a battery support body 80 located between the plurality of batteries 60. For example, the second battery support body 82 may be disposed and/or arranged between two adjacent batteries 60 of the plurality of batteries 60.

The second battery support body 82 may include a second bracket 821, which may be coupled to the wing frame, and a second shock absorber 822, which may be coupled to the second bracket 821 and may be in contact with the battery 60. In order for the second shock absorber 822 to be in contact with the battery 60 and support the battery 60, the second shock absorber 822 may be coupled to each of the left and right sides of a second bracket body 8211.

The second bracket 821 may include the second bracket body 8211. The second bracket body 8211 may be coupled to the wing frame or coupled to the battery 60, for example, using fasteners or the like. The second bracket 821 may include a second bracket coupling portion 8210 that is provided on the second bracket body 8211. A pair of second bracket coupling portions 8210 may be provided and respectively disposed on the left and right surfaces of the second bracket body 8211. The pair of second bracket coupling portions 8210 may include a second-first bracket coupling portion disposed on the left surface of the second bracket body 8211 and a second-second bracket coupling portion disposed on the right surface of the second bracket body 8211. The second bracket coupling portions 8210 may include holes that pass through the second bracket body 8211 in the left-right direction as illustrated in the drawing, or may include grooves that are formed by recessing the second bracket body 8211 in the left-right direction. The two second bracket coupling portions 8210 may be provided on each of the left and right surfaces of the second bracket body 8211 and may be spaced apart from each other in the front-rear direction as depicted in the drawings, but the number and arrangement thereof are not limited thereto.

The second bracket 821 may include a second bracket upper hole 8212. The second bracket upper hole 8212 may be formed by passing through the upper surface of the second bracket body 8211. The second bracket upper hole 8212 may extend in the front-rear direction. The second bracket upper hole 8212 may include a plurality of second bracket upper holes and may be arranged spaced apart from each other in the front-rear direction. The drawing illustrates three second bracket upper holes 8212, but the number thereof is not limited thereto. The second bracket 821 may have second bracket lower holes that are provided on the lower surface of the second bracket body 8211. The second bracket 821 lower holes may be symmetrical with the second bracket upper holes 8212.

The second bracket 821 may include a second bracket cavity 8213. The second bracket cavity 8213 may be formed by passing through the second bracket body 8211 in the front-rear direction.

The second shock absorber 822 may include a second-first shock absorber 822-1 and a second-second shock absorber 822-2. The second-first shock absorber 822-1 may be in contact with the battery 60 that is located inside the second bracket 821 in the left-right direction among the plurality of batteries 60. That is, the second-first shock absorber 822-1 may be coupled to the inner surface of the second bracket 821 in the left-right direction. The second-second shock absorber 822-2 may be in contact with the battery 60 that is located outside the second bracket 821 in the left-right direction among the plurality of batteries 60. That is, the second-second shock absorber 822-2 may be coupled to the outer surface of the second bracket 821 in the left-right direction.

The second-first shock absorber 822-1 may include a second-first shock absorber body 8221. The second-first shock absorber 822-1 may include a plurality of second-first shock absorber grooves 8222 that may be formed by recessing the surface of the second-first shock absorber body 8221. The inner surface of the second-first shock absorber body 8221 may be recessed outward in the left-right direction to form the second-first shock absorber grooves 8222. The plurality of second-first shock absorber grooves 8222 may be arranged spaced apart from each other in the front-rear direction. The plurality of second-first shock absorber grooves 8222 may be provided in the second-first shock absorber body 8221, and thus, the inner surface of the second-first shock absorber body 8221 may have an appearance that is corrugated in the left-right direction.

The second-second shock absorber 822-2 may include a second-second shock absorber body (similar to the second-first shock absorber body 8221). The second-second shock absorber 822-2 may include a plurality of second-second shock absorber grooves (similar to the plurality of second-first shock absorber grooves 8222) that may be formed by recessing the surface of the second-second shock absorber body. The outer surface of the second-second shock absorber body may be recessed inward in the left-right direction to form the second-second shock absorber grooves. The plurality of second-second shock absorber grooves may be arranged spaced apart from each other in the front-rear direction. The plurality of second-second shock absorber grooves may be provided in the second-second shock absorber body, and thus, the outer surface of the second-second shock absorber body may have an appearance that is corrugated in the left-right direction.

The second-first shock absorber 822-1 may include a second-first shock absorber protrusion 8223 that protrudes from the second-first shock absorber body 8221 and may be inserted into second-first bracket coupling portion 8210. The second-first shock absorber protrusion 8223 may protrude outward from the outer surface of the second-first shock absorber body 8221 in the left-right direction. The second-first shock absorber protrusion 8223 may be inserted into and coupled to the second-first bracket coupling portion 8210 that may be provided on the inner surface of the second bracket body 8211 in the left-right direction among the second-first bracket coupling portions 8210.

The second-first shock absorber 822-1 may be fixed to the second bracket 821. For example, a double-sided tape may be attached to at least a portion of the outer surface of the second-first shock absorber body 8221 adjacent to the second-first shock absorber protrusion 8223. The double-sided tape may be attached to one or more of each of the second bracket body 8211 and the second-first shock absorber body 8221, and thus, the second-first shock absorber 822-1 may be fixed to the second bracket 821.

The second-second shock absorber 822-2 may include a second-second shock absorber protrusion 8223 that protrudes from the second-second shock absorber body 8221 and is inserted into second-second bracket coupling portion 8210. The second-second shock absorber protrusion 8223 may protrude inward from the inner surface of the second-second shock absorber body 8221 in the left-right direction. The second-second shock absorber protrusion 8223 may be inserted into and coupled to the second-second bracket coupling portion 8210 that is provided on the outer surface of the second bracket body 8211 in the left-right direction among the second-second bracket coupling portions 8210.

The second-second shock absorber 822-2 may be fixed to the second bracket 821. For example, a double-sided tape may be attached to at least a portion of the outer surface of the second-second shock absorber body 8221 adjacent to the second-second shock absorber protrusion 8223. The double-sided tape may be attached to one or more of each of the second bracket body 8211 and the second-second shock absorber body 8221, and thus, the second-second shock absorber 822-2 may be fixed to the second bracket 821.

The second-first shock absorber 822-1 may include a plurality of second-first shock absorbing units 822*a* and 822*b* that are divided in the front-rear direction. Each of the second-first shock absorbing units 822*a* and 822*b* may be provided with a second-first shock absorber body 8221 and a second-first shock absorber protrusion 8223. The drawing depicts that the second-first shock absorbing units 822*a* and 822*b* have two shock absorbing units, such as a second-first-first shock absorbing unit 822*a* and a second-first-second shock absorbing unit 822*b*, but the number thereof is not limited thereto.

The second-second shock absorber 822-2 may include a plurality of second-second shock absorbing units 822*c* and 822*d* that are divided in the front-rear direction. Each of the second-second shock absorbing units 822*c* and 822*d* may be provided with a second-second shock absorber body 8221 and a second-second shock absorber protrusion 8223. The drawing depicts that the second-second shock absorbing units 822*c* and 822*d* have two shock absorbing units, such as a second-second-first shock absorbing unit 822*c* and a second-second-second shock absorbing unit 822*d*, but the number thereof is not limited thereto.

Figure 7:
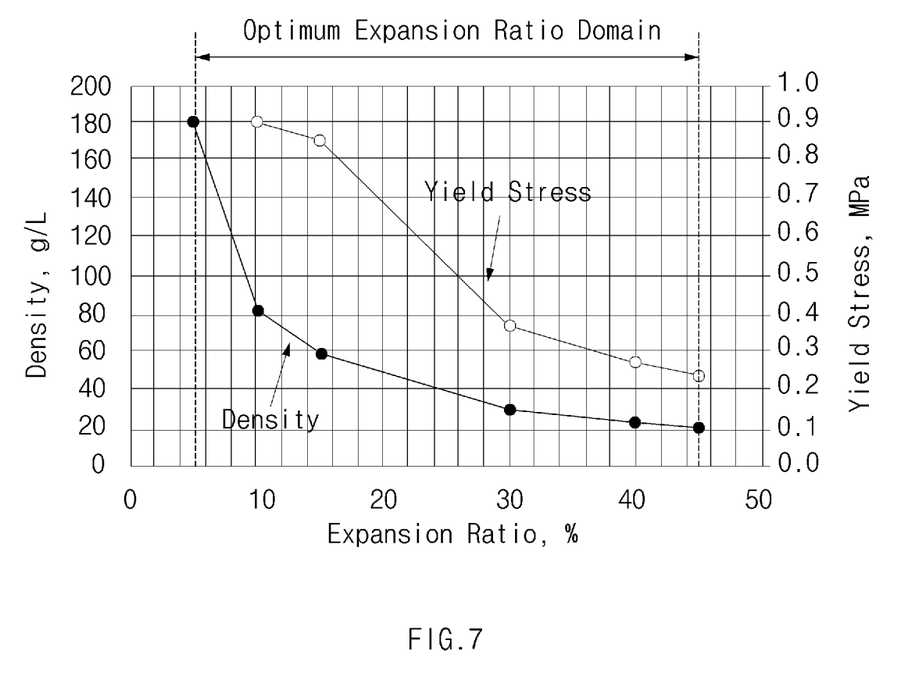
FIG. 7 is a graph showing the density and yield stress according to expansion ratios of a shock absorber of a battery support body according to one or more examples of the present disclosure.

FIG. 7 is a graph showing the density and yield stress according to expansion ratios of shock absorbers 812, 822, and 832 of a battery support body 80 according to one or more aspects of the present disclosure.

The expansion ratios of the shock absorbers 812, 822, and 832 may be about 5% to about 45%. The shock absorbers 812, 822, and 832 may be provided in the form of foam and have a cell structure. When a load is applied to each of the shock absorbers 812, 822, and 832 from the outside, the cell may elastically deform initially, and a shock absorbing action may be generated. During realignment between the cells, a stress increase may be relieved. However, if a load is continuously applied, the shock absorbers 812, 822, and 832 may no longer withstand the load and may break.

Referring to the drawings, it can be seen that the expansion ratio and the density may have an inversely proportional relationship. As the expansion ratio increases, the density of each of the shock absorbers 812, 822, and 832 may decrease, and thus, weight reduction becomes possible. However, as the expansion ratio increases, the yield stress may also decrease simultaneously, and thus, breakage may easily occur even with a small load. Therefore, if the expansion ratio, density, and yield stress of each of the shock absorbers 812, 822, and 832 show values as depicted in the graph of FIG. 7, the expansion ratios of the shock absorbers 812, 822, and 832 may be determined in a range from about 5% to about 45% so that the shock absorbers 812, 822, and 832 may have appropriate shock absorbing effects.

If the battery support body 80 is applied to the batteries 60, the resonance point of the entire structure including the batteries 60 may increase compared to a case where the battery support body 80 is not applied. The resonance frequency may be expressed as the square root of the value obtained by dividing the rigidity by the mass, and thus, it can be seen that the rigidity may increase as the resonance frequency increases. Therefore, it can be seen that the rigidity of the entire structure including the batteries 60 may increase by applying the battery support body 80 to the batteries 60.

Accordingly, it may be possible to increases the rigidity of the structure including the batteries while minimizing the weight increase of the wing.

Even though all the components constituting examples of the present disclosure have been described as being combined as one body or operating in combination, the present disclosure is not necessarily limited to such examples. That is, within the scope of the objectives of the present disclosure, all the components may be selectively combined into one or more and then operated. Also, terms such as "include," "constitute," or "have" described above may mean that the corresponding components may be included unless explicitly described to the contrary, and thus may be construed as further including other components rather than excluding other components.

One or more aspects of the present disclosure provides a battery support body including: a bracket extending in a front-rear direction; and a shock absorber, which extends in the front-rear direction and is coupled to the bracket in a direction crossing the front-rear direction, and at least a portion of which is provided in the form of foam.

One or more additional aspects of the present disclosure provides an aircraft including: a fuselage; and a wing extending from the fuselage in a left-right direction, wherein the wing includes: a wing frame coupled to the fuselage; a plurality of batteries which are coupled to the wing frame, arranged in the left-right direction, and configured to store power; a plurality of power relay assemblies electrically connected to the plurality of batteries; and a plurality of battery support bodies which are arranged between the plurality of batteries or between the batteries and the power relay assemblies to support the plurality of batteries.

The technical ideas of the present disclosure have been described merely for purposes of example, and those skilled in the art appreciate that various changes and modifications are possible without departing from the essential features of the present disclosure. Therefore, the examples of the present disclosure are not to be considered restrictive, and the technical idea of the present disclosure is not limited to the foregoing examples. The protective scope of the present disclosure is defined by the appended claims, and all technical ideas within their equivalents should be interpreted as being included in the scope of the present disclosure.

What is claimed is:

1. A body comprising:
a bracket extending in a front-rear direction; and
a shock absorber, extending in the front-rear direction and coupled to the bracket in a direction crossing the front-rear direction, and at least a portion of which comprises a foam,
wherein the shock absorber comprises a shock absorber body and a plurality of shock absorber grooves formed by recessing a surface of the shock absorber body, and
wherein an inner surface of the shock absorber body has an appearance that is corrugated.

2. The body of claim 1, wherein the bracket comprises a bracket body and a bracket coupling portion provided in the bracket body, and wherein
the shock absorber further comprises a shock absorber protrusion that protrudes from the shock absorber body and is inserted into the bracket coupling portion.

3. The body of claim 1, wherein the shock absorber is made of a material that comprises at least one of foamed polypropylene, polyurethane, polyethylene, aluminum, rubber, polystyrene, or any combination thereof.

4. The body of claim 1, wherein an expansion ratio of the shock absorber is about 5% to about 45%.

5. The body of claim 1, wherein the shock absorber comprises a plurality of shock absorbing units divided in the front-rear direction.

6. The body of claim 1, wherein the body comprises at least one battery support body, and wherein the at least one battery support body comprises the bracket and the shock absorber.

7. The body of claim 1, wherein the body comprises comprise a first battery support body located between a central power relay assembly and a battery, of a plurality of batteries, adjacent to the central power relay assembly.

8. The body of claim 7, wherein the first battery support body comprises the bracket and the shock absorber, wherein the bracket is coupled to a wing frame, and wherein the shock absorber is in contact with the battery of the plurality of batteries.

9. The body of claim 1, wherein the body comprises a plurality of battery support bodies, each of which is arranged between two adjacent batteries of a plurality of batteries or between one battery of the plurality of batteries and one power relay assembly of a plurality of power relay assemblies, to support the plurality of batteries.

10. The body of claim 9, wherein the plurality of battery support bodies comprise a second battery support body located between the two adjacent batteries of the plurality of batteries.

11. The body of claim 10, wherein the second battery support body comprises a second bracket coupled to a wing frame, a second-first shock absorber coupled to the second bracket and in contact with a first battery, of the plurality of batteries, located inside the second bracket in a wing root-wing tip direction, and a second-second shock absorber in contact with a second battery, of the plurality of batteries, located outside the second bracket in the wing root- wing tip direction.

12. The body of claim 11, wherein the second bracket comprises a second bracket body and a second-first and a second-second bracket coupling portion that are respectively provided on a left surface and a right surface of the second bracket body,
wherein the second-first shock absorber comprises a second-first shock absorber body and a second-first shock absorber protrusion that protrudes from the second-first shock absorber body and is inserted into one of the second-first and second-second bracket coupling portions, and
wherein the second-second shock absorber comprises a second-second shock absorber body and a second-second shock absorber protrusion that protrudes from the second-second shock absorber body and is inserted into the other one of the second-first and second-second bracket coupling portions.

13. The body of claim 12, wherein the second bracket further comprises a second bracket upper hole formed by passing through an upper surface of the second bracket body, and wherein the second bracket further comprises a second bracket cavity formed by passing through the second bracket body in the front-rear direction.

* * * * *